US009463868B2

United States Patent
Hagerott et al.

(10) Patent No.: US 9,463,868 B2
(45) Date of Patent: Oct. 11, 2016

(54) SYSTEMS AND METHODS FOR AIRCRAFT CONTROL SURFACE HARDOVER AND DISCONNECT PROTECTION

(71) Applicant: Cessna Aircraft Company, Wichita, KS (US)

(72) Inventors: Steven G. Hagerott, Wichita, KS (US); Stephen M. Eddy, Derby, KS (US); Utbah Masud, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 31 days.

(21) Appl. No.: 14/590,614

(22) Filed: Jan. 6, 2015

(65) Prior Publication Data

US 2016/0194074 A1 Jul. 7, 2016

(51) Int. Cl.
*G05D 1/00* (2006.01)
*B64C 13/16* (2006.01)
*G05D 1/08* (2006.01)

(52) U.S. Cl.
CPC .............. *B64C 13/16* (2013.01); *G05D 1/0816* (2013.01)

(58) Field of Classification Search
CPC ........... G01C 23/00; G05D 1/00; G05D 1/08
USPC ..................... 701/5, 3, 9; 244/178, 181, 195
See application file for complete search history.

(56) References Cited

U.S. PATENT DOCUMENTS

| 4,354,240 A | 10/1982 | Olive |
| 4,392,203 A | 7/1983 | Fischer et al. |
| 5,008,825 A | 4/1991 | Nadkarni et al. |
| 7,908,043 B2 | 3/2011 | Villaume et al. |
| 8,190,309 B2* | 5/2012 | Boe ........................ G01C 23/00 340/945 |
| 8,306,679 B2 | 11/2012 | Meunier et al. |
| 8,515,598 B2 | 8/2013 | Louise et al. |
| 8,620,492 B2 | 12/2013 | Hagerott et al. |
| 9,174,745 B1* | 11/2015 | Jimenez ................. B64D 45/00 |
| 2009/0157241 A1 | 6/2009 | Meunier et al. |
| 2012/0325977 A1* | 12/2012 | Giesseler ............. G05D 1/0066 244/213 |
| 2013/0247117 A1 | 9/2013 | Yamada et al. |

* cited by examiner

*Primary Examiner* — Thomas G Black
*Assistant Examiner* — Luke Huynh
(74) *Attorney, Agent, or Firm* — Erise IP, P.A.

(57) ABSTRACT

Systems and methods are described for automatically counteracting undesirable aircraft movement caused by malfunctioning fly-by-wire aircraft control surfaces, hardover events, control surface disconnection, and other control surface failure events. The systems and methods include control law algorithms for reacting to such events to counteract the undesired aircraft movement. An expected roll rate is generated based on control input and compared to the actual roll rate of the aircraft.

18 Claims, 7 Drawing Sheets

SYSTEMS AND METHODS FOR AIRCRAFT CONTROL SURFACE HARDOVER AND DISCONNECT PROTECTION

BACKGROUND OF THE INVENTION

1. Field of the Invention

The hardover protection systems and methods are in the field of aircraft flight control systems. More specifically, the hardover protection systems and methods are in the field of control algorithms for fly-by-wire aircraft flight controls and control surfaces such as spoilers, ailerons, and other control surfaces.

2. Description of the Related Art

Unintended deflections of aircraft control surfaces may lead to undesirable aircraft movement, and sometimes catastrophic loss of control of the aircraft. The unintended deflections, sometimes known as hardover events, may be caused by actuator malfunction, disconnection of control cables or actuators, or other system failures. In some hardover events, control surfaces may be jammed or immobilized in the fully deflected position. Safe aircraft operation requires systems and methods of counteracting hardover events to prevent loss of control and potential crash of the aircraft.

In some existing systems, several smaller control surface panels are used so that a failure of one control surface panel will have a lesser impact on the aircraft movement and control. The multiple panels require additional actuators and lead to added complexity and expense.

Many existing systems for detecting and counteracting hardover protection in fly-by-wire aircraft use surface position monitoring or disconnect detection devices and methods to determine when a control surface is jammed, disconnected or in a hardover condition. Some existing systems utilize two actuators per control surface to prevent hardover or disconnect events. These devices and methods add significant complexity to the control systems for the aircraft. The additional complexity adds expense and additional potential for failure of the sensors and systems used by the hardover detection system.

The systems and methods for protecting against control surface hardover and disconnection described herein do not require additional sensors or devices to measure the deflection of the aircraft control surfaces or to detect control surfaces disconnection. Utilizing additional control law algorithms for standard aircraft control surfaces, the described invention provides automatic systems and methods for counteracting undesired aircraft movement caused by control surface failures. As a result, larger control surface panels may be provided on an aircraft using the described systems and methods, thus further reducing the required number of actuators.

BRIEF SUMMARY OF THE INVENTION

In some embodiments of the invention, a method of operating an aircraft to counteract unintended control surface deflections includes the following steps. When the pilot provides control input for the aircraft, the aircraft responds to that by altering its motion. If there is an unintended control surface movement that will also cause the aircraft to respond by altering its motion. The system continuously calculates an expected value for the motion of the aircraft based on the pilot's input to the controls of the aircraft. It simultaneously measures the actual motion of the aircraft. If there is a difference between the expected motion of the aircraft and its actual motion, then the system generates an error signal. The system then generates and sends a command signal to the aircraft control surfaces based on the error signal that will counteract the error signal and tend to reduce the error signal.

In some embodiments of the invention, the system calculates the expected value for the aircraft motion by calculating the command signal for the aircraft based on the control input received from the pilot, and then calculating the expected motion of the aircraft based on that command signal.

In some embodiments, the system calculates the expected roll rate of the aircraft based on the spoiler command signal. In some embodiments, the control surface used by the system to counteract the error signal is the aircraft spoilers. In other embodiments, the expected aircraft motion is calculated based on the sum of the expected roll rates caused by the aileron command signal and the spoiler command signal.

In other embodiments, expected and actual yaw rate of the aircraft are used to generate the error signal. Command signals are calculated, based on pilot input, for one or more rudder segment or rudder surface. The phrases "rudder segment" and "rudder surface" are used interchangeably herein. The command signals for the rudder segments are then used to calculate an expected yaw rate from each rudder segment, which are then added together to calculate the total expected yaw rate. The total expected yaw rate is compared to the actual yaw rate to calculate an error signal from which a command is calculated. This command is then used to modify the command signal for one or more rudder segments or other yaw control surfaces.

In some embodiments, operating the control surface in response to the error signal requires calculating a nominal command for the control surface based on the control input and then adding the error signal to the nominal command to calculate a modified command. The control surface is then operated in response to the modified command instead of the nominal command signal which would be used otherwise.

In some embodiments, the value for the selected parameter of actual aircraft motion is measured so it can be compared to the expected command. The value for the parameter of aircraft motion may be determined by measuring some characteristic of motion of the aircraft and then estimating or calculating the value for the parameter of aircraft motion based on that characteristic of motion.

In some cases, the unintended control surface deflection that is opposed by the system is a hardover event where one of the aircraft control surfaces is jammed at its full deflection. In other cases, the unintended control surface deflection is a control surface disconnection event wherein the control surface is no longer connected to the actuators that move the control surface.

In another embodiment of the system, it is used on an aircraft having two control surfaces for one of its characteristic motions. Similar to the prior embodiment, the system accepts a command input for the aircraft from the pilot and calculates an expected value for some parameter of motion of the aircraft. The parameter of motion that is measured is related to the two control surfaces, in that they typically are the control surfaces used to alter that type of aircraft motion. For example, ailerons and spoilers for aircraft roll rate, or rudder for yaw rate. The actual value of the parameter is measured. Then an error signal is calculated representing the difference between the expected value and the actual value of the parameter of the aircraft's motion. Either one or the other of the two control surfaces are then operated to counteract the error signal. In some embodiments this happens continuously throughout aircraft operation.

In some embodiments, the parameter of motion is the roll rate of the aircraft, and one of the control surfaces is a spoiler and the other control surface is an aileron.

In various embodiments, the expected value of the aircraft motion is calculated by multiplying the pilot's command input by a gain.

In some embodiments, a low-pass filter is applied to the expected value of the parameter of motion.

In further embodiments, the parameter of motion is determined by estimating a value for the sideslip of the aircraft and subtracting the estimated value from the expected value of the sideslip for the aircraft. In some embodiments, estimating a value for the sideslip of the aircraft is accomplished by measuring the value of the yaw command signal.

DETAILED DESCRIPTION OF THE INVENTION

The systems and methods of the present invention are embodied as a control law algorithm for an aircraft. In some embodiments the control law algorithm is executed on a flight control computer, however the details of the device (electrical, optical, digital, analog, etc.) used to execute the control law are not limiting of the invention described herein. The control law counteracts a malfunctioning control surface by using another control surface on the aircraft to provide control forces to counter the malfunctioning control surface. The control law utilizes the difference between (i) the expected value of a parameter of aircraft motion based on pilot input, and (ii) the actual measured or calculated value of that parameter of aircraft motion. The selected parameter of motion is one that is associated with the control surface to be counteracted. In some embodiments, the parameter of motion selected for a spoiler or aileron may be the roll rate. In other embodiments, the parameter of motion selected for a rudder may be the yaw rate, or for an elevator may be the pitch rate.

In one embodiment, the control law utilizes roll rate feedback to a roll control surface to counteract any significant deviations from the expected roll rate based on pilot input. The use of the expected roll rate based on pilot input allows the control law to counter uncommanded deviations without counteracting pilot input to the roll control surfaces. For example, if a control surface unexpectedly disconnects from the control system or is jammed in a fully or partially extended position, significant deviations from the expected aircraft flight motion may be generated, including catastrophic failures and crashes.

Figure 1:
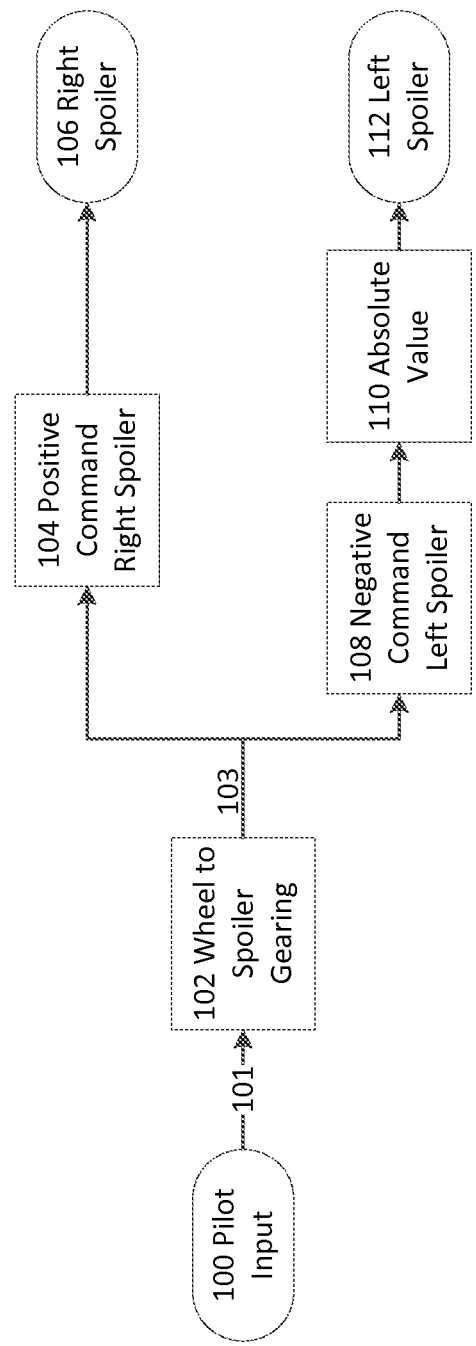
FIG. 1 depicts a traditional control law for an aircraft control surface.

Referring now to FIG. 1, a traditional control law for an aircraft control surface is depicted. In the depiction, the control surface is a spoiler, though in other situations similar control laws may be utilized on other control surfaces for an aircraft. A pilot of an aircraft provides control input 100 through control means provided in the aircraft, such as a control wheel, yoke or control stick. In a typical fly-by-wire system, the physical movement of the control means by the pilot is converted into a signal 101 representative of the movement. Signal 101 may be electrical, optical or some other means of transmitting a signal, and may be converted back and forth between such means as appropriate.

Signal 101 is processed in step 102 to compensate for the desired response of the spoilers to the pilot input 100. Processing step 102 may comprise applying a gain to the signal 101. Processing step 102 may also adjust the signal 101 for other relevant aircraft conditions such as the positioning of other control surfaces or landing gear, or the current flight mode in which the aircraft is operating.

The output of step 102 generates a spoiler command 103. Spoilers typically only operate in an upward direction from the top surface of an aircraft wing. A positive command 104 indicates actuation of the right spoiler, and is output as the right spoiler command 106. A negative signal 103 represents actuation of the left spoiler. Since the command 108 is negative, an absolute value 110 is applied to create left spoiler command 112.

The invention described herein augments the traditional control law to offset unintended aircraft movement. In one embodiment of the invention, the systems and methods of the invention utilize a model of the aircraft response to calculate a predicted roll rate based on pilot (or autopilot) input. The predicted roll rate is compared to the actual roll rate of the aircraft. The control law automatically counteracts discrepancies between the predicted roll rate and the actual roll rate. Those discrepancies may be caused by hardover events, control surface malfunction or disconnection, or other reasons.

Figure 2:
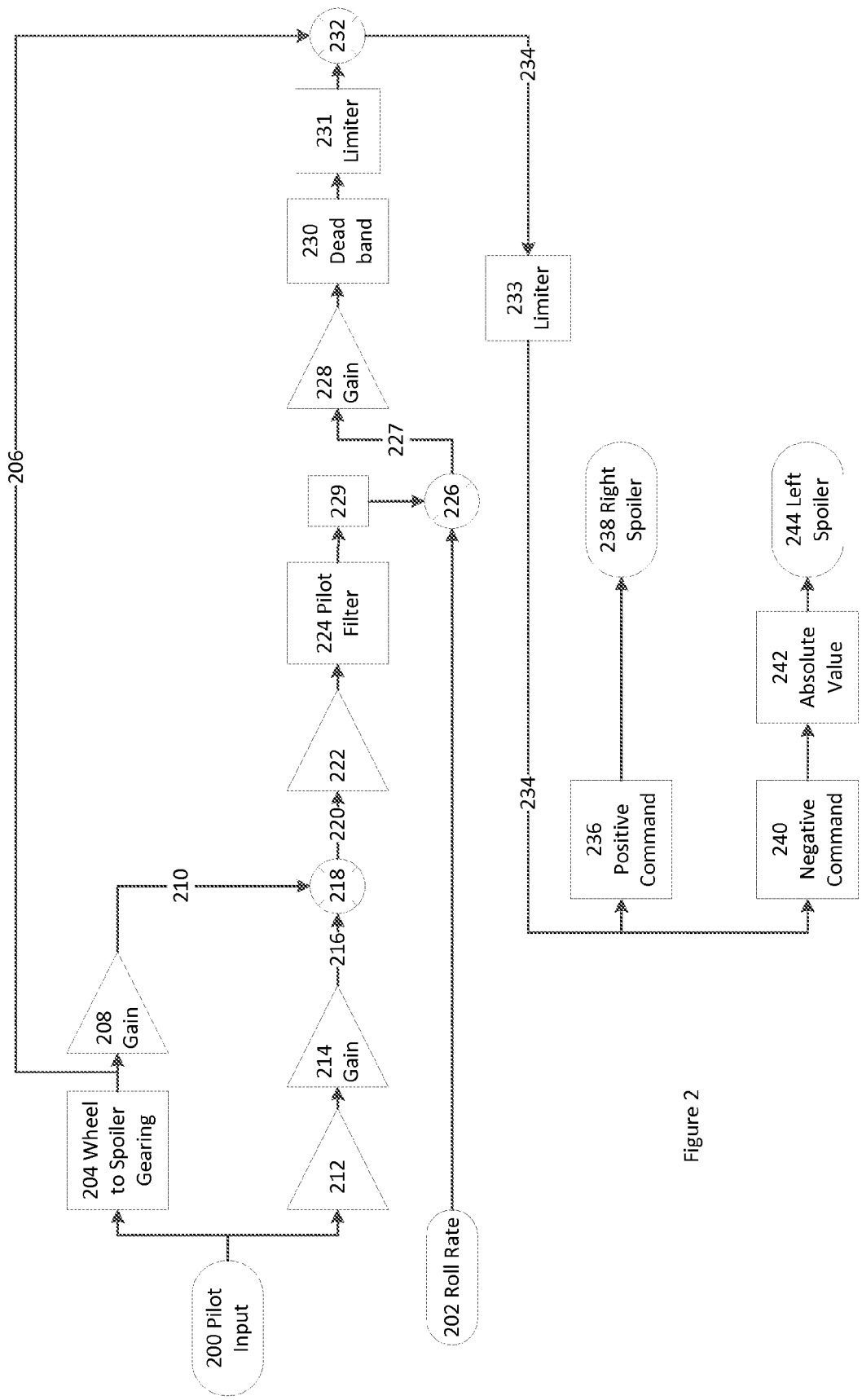
FIG. 2 depicts a control law for an aircraft control surface incorporating an embodiment of the systems and methods of the invention.

Referring now to FIG. 2, an embodiment of the control law of the present invention is depicted. A first portion of the control law generates a predicted roll rate signal 220. As with the traditional control law, pilot input 200 is received from the pilot via a wheel, yoke, control stick, or other appropriate means. This embodiment also receives a roll rate 202 of the aircraft as a second input to the control law. The roll rate 202 may be determined by directly measuring the roll rate using a variety of sensors or by calculating the roll rate based on various other sensed attributes of aircraft motion. In other embodiments of the inventive control law, the quantity 202 may be another measure of aircraft movement such as yaw rate, pitch rate, or other parameters of aircraft movement.

The pilot input 200 is processed by a similar algorithm 204 to account for the gearing between the control means and the spoiler response as in step 102 referred to with reference to FIG. 1. The output of step 204 is the spoiler gearing command 206 which is similar to that generated by the traditional control law. Command 206 represents the nominal command that is calculated for the spoiler based on the control input. A gain 208 is applied to the command 206 to model the predicted, or expected, roll rate that is expected to result from the command 206. In some embodiments of the systems and methods of the invention, the gain is determined based on the characteristics of the aircraft. These characteristics include, without limitation, the size of the spoilers, the size of the ailerons, and other aerodynamic characteristics of the aircraft. In other embodiments, the gain 208 may be an estimated value or may be determined through flight testing. The output of gain 208 is the expected roll rate 210 due to the spoilers.

Pilot input 200 is also processed by step 212 to generate an expected aileron command. The actual process of step 212 will vary depending on the aileron control law used on the aircraft so that the output of step 212 will represent the command actually provided to the ailerons on the aircraft. In some embodiments of the systems and methods of the present invention, the step 212 may apply a gain to the pilot input 200 based on the aileron gearing ratio of the aircraft control system. A gain 214 is applied to the expected aileron command output from step 212 to model the predicted roll rate that is expected to result from the aileron command. In some embodiments of the systems and methods of the present invention, the gain is determined based on the characteristics of the aircraft similar to those described for gain 208, or may be estimated or determined through flight testing. The output of gain 214 is the expected roll rate 216 due to the ailerons.

The expected roll rates 210 and 216 are summed at step 218 to generate the predicted roll rate 220 for the aircraft. A gain 222 may be applied, if necessary, to the predicted roll rate 220 to calibrate the roll rate model and to compensate for inaccuracy in the predicted roll rate 220. Gain 222 allows modification of the predicted roll rate 220 at a single point in the control law. In some embodiments, the gain 222 is 1.0 and does not alter signal 220. This may be achieved by calibrating the roll rate prediction through flight testing so that no adjustment and gain 222 is necessary. In other embodiments, gain 222 may vary as needed to adjust the control law for the aircraft to provide a desired accuracy in the predicted roll rate 220. Flight testing to determine gain 214 and gain 208 with sufficient accuracy may reduce the need to adjust gain 222.

Pilot filter 224 is applied to the expected roll rate signal after application of gain 222. Filter 224 is a first-order low-pass filter which filters out high frequency components of the signal that arise from pilot inputs and alters system response based on an applicable time constant. This filter models the aircraft response to high frequency components of the pilot input. The aircraft doesn't respond immediately to pilot input, and the actual roll rate from pilot input increases gradually based on the effective roll mode time constant of the aircraft. The time constant of the filter 224 causes the predicted roll rate 220 to gradually respond to pilot input in a manner similar to that displayed by the actual aircraft. In the case of roll rate hardover protection, the filter corresponds to the roll mode time constant of the aircraft. As will be discussed in relation to a later figure, the performance of the system is not sensitive to errors in the time constant of filter 224 as compared to the actual time constant of the aircraft.

A time delay may develop between the signal for the measured roll rate 202 and the predicted roll rate signal 220. A portion of the time delay is the result of measurement delays arising from the sensors used to measure the roll rate 202 and transmit it to the controller. There is also time delay arising from the delay between command input from the pilot and the movement of the actuators in response to that command. A time delay 229 is applied to the modified predicted roll rate after application of the pilot filter 224 to synchronize it with the actual roll rate 202. The time delay adjusts the timing of the filtered pilot command signal to match the delayed measured signal before the two signals are combined as described below. In other embodiments, the time delay 229 may be applied to the predicted roll rate 220 at other points in the process.

The measured roll rate 202 is subtracted from the output of filter 224 and time delay 229 at step 226. This produces an error signal 227 that represents the difference between the expected roll rate 220, as modified by the prior steps, and the measured roll rate 202. Gain 228 is applied to error signal 227 to keep the bank angle deviation due to the surface failure within desired limits. The desired limits may be based on certification requirements set by applicable regulatory authorities. The gain 228 is scheduled so that the maximum unintended deflection by a control surface will not cause the aircraft bank angle to exceed the allowable magnitude as determined by certification authorities. Gain and phase margin constraints of the feedback loop also constrain the gain 228. The gain 228, measured in degrees/degrees per second, is dependent on flight conditions, such as airspeed, and aircraft configuration, such as the flap position in a roll rate system. In some embodiments, the gain 228 is linearly scheduled with airspeed and flaps deflection of the aircraft.

In the depicted embodiment, a deadband 230 is applied to the modified error signal 227 to remove small oscillations from the error signal 227. The deadband 230 prevents the system from responding to minor roll rate deviations such as those caused by turbulence which do not require a commanded response from the pilot via spoilers. The width of the deadband 230 is selected to ignore the small deviations that may be attributable to turbulence or other effects, but small enough to remain effective in mitigating a hard over or disconnected roll control surface.

In some embodiments, an optional limiter 231 is applied to the output signal of deadband 230. The limiter 231 limits the control authority of the corrective system relative to the control authority of the pilot by imposing maximum values on the corrective control signal generated by the system before it is used to modify the command 206.

The modified error signal 227 is then summed with the spoiler gearing command 206 at step 232 to produce spoiler command 234. In some embodiments, an optional limiter 233 is applied to spoiler command 234. Limiter 233 imposes maximum values on the spoiler command 234 to keep the signal with the applicable spoiler ranges for the aircraft. The spoiler command 234 is then modified similarly to the traditional process described with reference to FIG. 1. If spoiler command 234 is positive, then signal 236 is used to actuate right spoiler 238. If spoiler command 234 is negative, then the absolute value 242 of the negative signal 240 is used to actuate left spoiler 244.

In other embodiments of the invention, additional parameters of aircraft motion may be incorporated into the inventive process to improve its accuracy. In one such embodiment, either the sensed sideslip or estimated sideslip of the aircraft is utilized in a modified control law. This sideslip signal would then be multiplied by a gain, scheduled by flight condition, and the resulting signal is used to reduce the expected roll rate signal 220 at summing junction 218. A simplified version of this embodiment may utilize the rudder pedal position as an input signal (yaw command signal), in lieu of a sideslip measurement or estimate. Referring to FIG. 2, this signal would subtract from summing junction 218. This supports operation of the aircraft in steady state sideslips, with the proper wheel input countering the rolling moment from that sideslip. Under this condition, the addition of this signal enables the roll rate prediction to avoid generation of an erroneously high predicted roll rate, which would result in unwanted spoiler commands generated by the control law.

This invention could also be applied to the yaw or pitch axes. In these cases, signals appropriate to the relevant axis would be used in combination with predicted aircraft response models to compare the expected response to actual response. In the case of the yaw axis, the pedal input along with the known rudder command scheduling would be input and used with an onboard pedal to sideslip model to compare measured sideslip to the expected sideslip. For the pitch axis, the column input and known column to elevator gearing would be used with an onboard elevator to pitch rate or normal load factor model to compare against the measured response of the airplane. For each of these cases, the long term trim effects would be removed via high pass filters so that only transient effects are managed.

Figure 3:
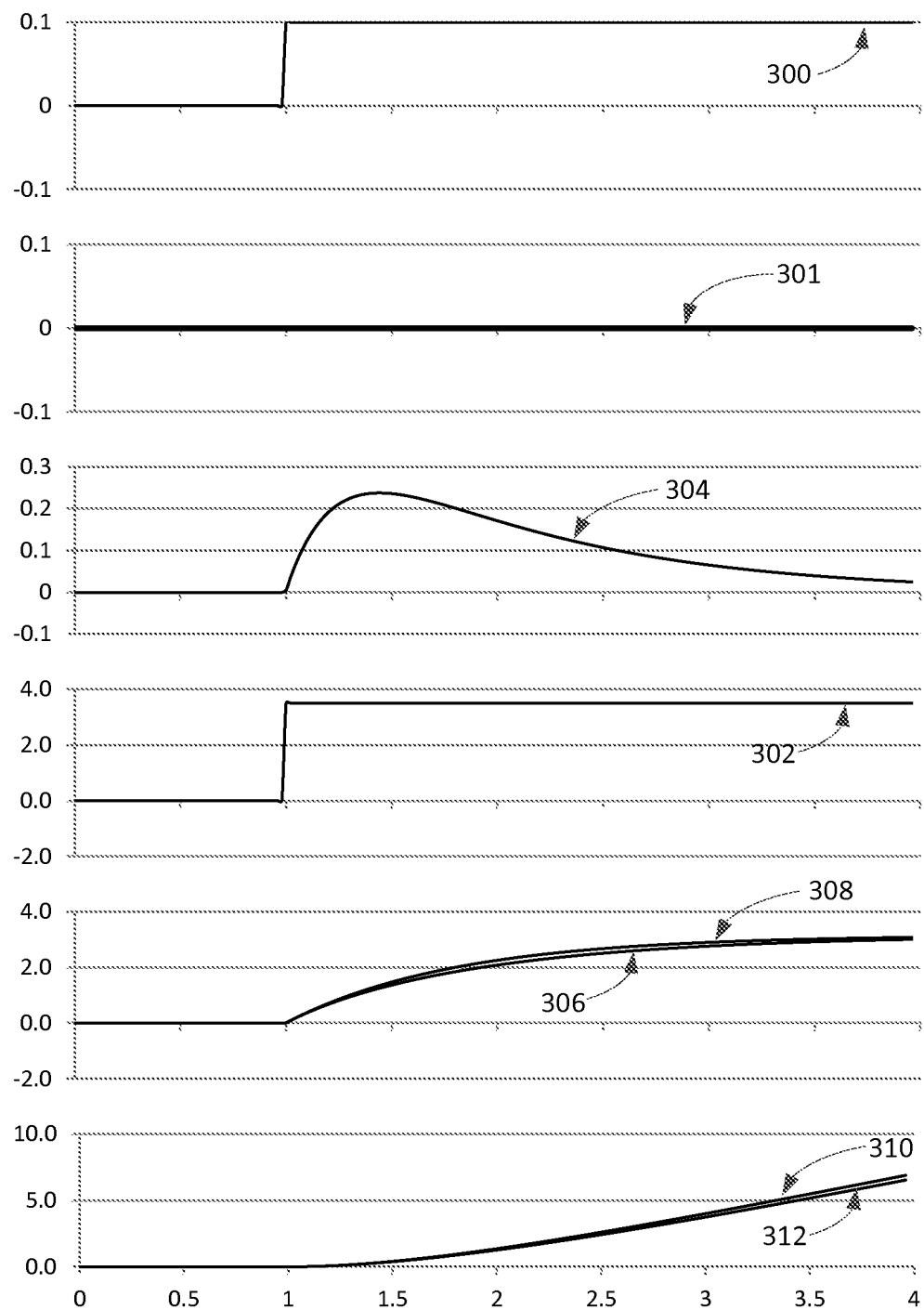
FIG. 3 depicts aircraft response to pilot input for aircraft utilizing a traditional control law and a control law comprising an embodiment of the invention.

Referring now to FIG. 3, the aircraft response to pilot input for an aircraft utilizing both a traditional control law algorithm and a control law algorithm comprising an embodiment of the invention are depicted. The horizontal axis depicts time in seconds, and the vertical axis is measured in degrees for the various control surface deflections and bank angle, and in degrees per second for the roll rate. Graph 300 depicts pilot input such as turning a wheel or yoke, or manipulating a control stick. The depicted pilot input represents a small amplitude pilot input. In the depicted embodiment, graph 300 depicts roll input from the pilot, and the embodiment of the invention is used to counter hardover events for roll control surfaces. In both the traditional control law and the control law of the invention, roll input 300 results in actuation of ailerons as shown in graph 302. The depicted aileron deflection represents an upward deflection of one aileron and a downward deflection of the opposing aileron. The aileron deflection creates roll rates 306 and 308 for the traditional and inventive control law. As a commanded aircraft roll movement, both control laws should produce the commanded roll rate. The traditional aircraft control law generates roll rate 308 and bank angle 310, which represent the typical, desired aircraft response to control input 300. The traditional control law does not produce any spoiler deflection 301 for this amplitude of control input.

In the situation depicted in FIG. 3, the inventive control law should produce results similar to the traditional control law. In addition to the aileron deflection 302, the depicted embodiment of the inventive control law causes spoiler deflection 304 of the left spoiler. The spoiler deflection 304 is produced by the difference between the roll rate of the aircraft 306 and the expected roll rate based on the control input 300. The initial difference is due to the aircraft response time to the control input 300. The control law immediately calculates the corresponding roll rate based on the control input 300 as adjusted based on an estimated time constant for the aircraft response to control input. However, the estimated time constant and the actual time constant of the aircraft may be slightly different. That difference results in a slightly negative spoiler command signal that causes a slight deflection of the left spoiler. As the roll rate 306 approaches the expected roll rate, the spoiler command 304 approaches zero. Spoiler command 304 is very small amplitude deflection and has only a slight impact on the motion of the aircraft, as can be seen by comparing the roll rate 306 for an aircraft using the inventive control law, and the roll rate 308 for an aircraft using a traditional control law. Similarly, the bank angle 312 for an aircraft using the inventive control law is very close to the bank angle 310 of the aircraft using the traditional control law. The inventive control law exhibits the desired behavior, closely matching the traditional control law in response to the depicted inputs.

Figure 4:
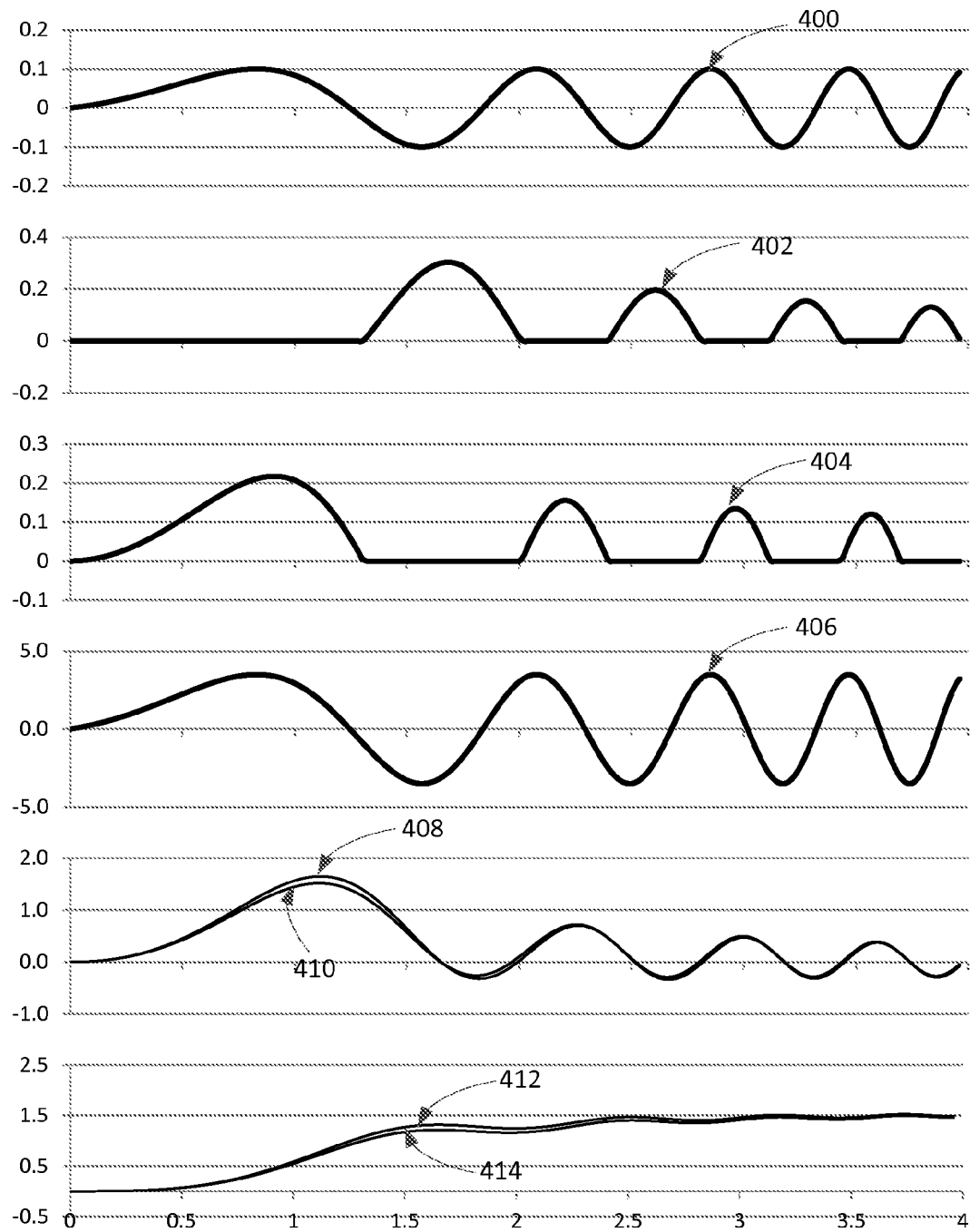
FIG. 4 depicts aircraft response to pilot input for aircraft utilizing a traditional control law and a control law comprising an embodiment of the invention.

Referring now to FIG. 4, the aircraft response to pilot input for an aircraft utilizing both a traditional control law and a control law comprising an embodiment of the invention is depicted. Similar to the scenario depicted in FIG. 3, the pilot of the aircraft operates the control means of the aircraft to command a roll movement of the aircraft. The control input 400 is an oscillating input. Both control laws generate aileron deflections as shown by graph 406, representing upward deflection of one aileron and downward deflection of the aileron on the opposing wing, oscillating back and forth in response to the pilot input. In the traditional control law system, the control surface deflections generate roll rate 408 and bank angle 412. As in the scenario depicted by FIG. 3, the roll rate 408 and bank angle 412 of the traditional control law are the desired results for the inventive control law.

The inventive control law also generates the same aileron deflection 406 as the traditional control law, and also spoiler commands 402 and 404. Similar to FIG. 3, the delay between control input 400 and aircraft response as shown by roll rate 408 is due to the aircraft's roll mode time constant. Any discrepancy between the actual roll mode time constant and the estimated roll mode time constant used to calculate the predicted roll rate will cause the inventive control law to generate spoiler commands 402 and 404 to counteract the discrepancy between actual and predicted roll rate until the actual roll rate approaches the expected roll rate. These spoiler commands are similar in nature to the spoiler command shown in FIG. 3, both of which counteract some of the commanded roll deflection. Despite the difference caused by the spoiler deflections, the roll rate 410 resulting from the inventive control law is very similar to the roll rate 408 resulting from the traditional control law. The bank angle 414 of the aircraft using the inventive control law is also very close to the bank angle 412 of the aircraft using the traditional control law.

FIGS. 3 and 4 depict the operation of the control laws during normal aircraft operation. The similarity between roll rate and bank angle between the two control laws indicates that during normal aircraft operation the inventive control law will not negatively impact the aircraft response to pilot input.

Figure 5:
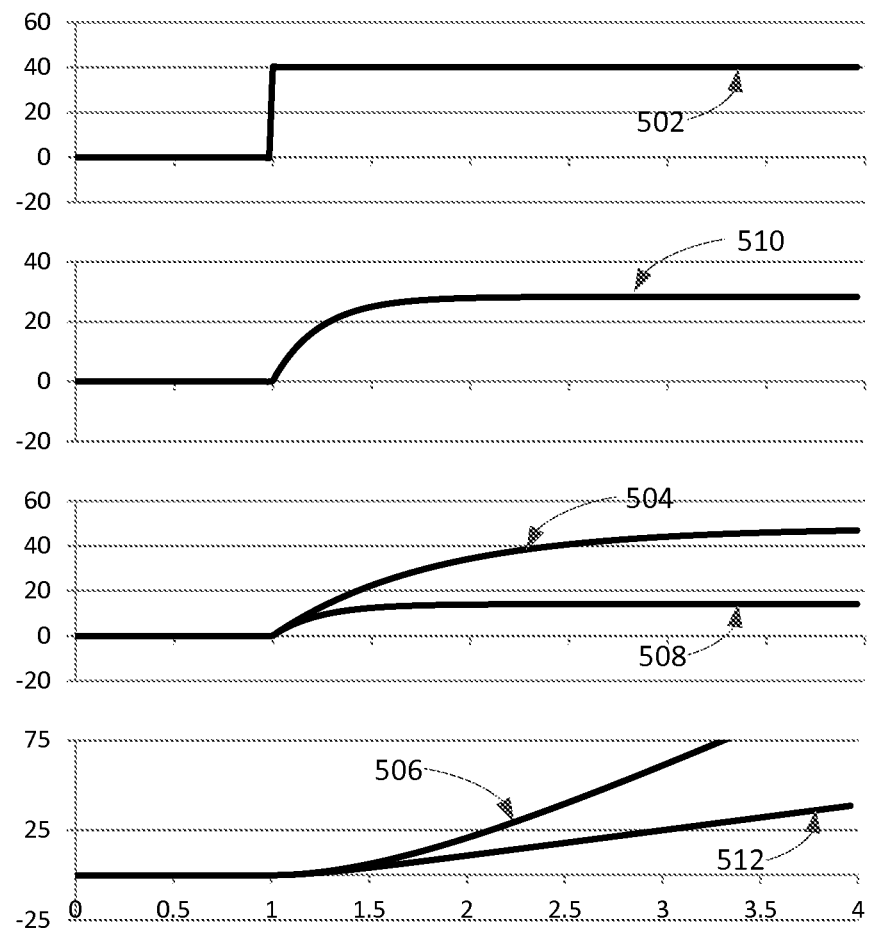
FIG. 5 depicts aircraft response to a hardover event for aircraft utilizing both a traditional control law and a control law comprising an embodiment of the invention.

Referring now to FIG. 5, the aircraft response to a hardover event for an aircraft utilizing both a traditional control law and a control law comprising an embodiment of the invention are depicted. Throughout the time sequence shown in FIG. 4, the control input is zero indicating a lack of pilot input during the depicted period. The hardover event is indicated by the full deflection of the right spoiler shown in graph 502. In the aircraft with the traditional control law, the aircraft roll rate 504 rapidly increases, and without pilot intervention will increase catastrophically. Similarly, the aircraft's bank angle 506 rapidly increases until the aircraft is inverted within a few seconds. If existing hardover protection systems fail to identify the hardover event, the aircraft may experience unsafe flying conditions or even crash before the pilot can respond.

In an aircraft using the inventive control law, the roll rate 508 immediately generates an error signal 220 because the expected roll rate is zero from the lack of control input. The error signal 220 generates a spoiler command to counteract the unexpected roll rate which causes the other spoiler to deflect as shown by graph 510 and it is at full deflection with 1-2 seconds. The commanded spoiler deflection immediately begins to counteract the roll caused by the hardover event. The resulting roll rate 508 resulting from the inventive control law is much less than the roll rate 504 caused by the traditional control law. The lower roll rate 504 results in a smaller bank angle 512 as compared to the bank angle 506 resulting from the traditional control law. This immediate counteraction by the inventive control law allows more time before catastrophic aircraft failure for the pilot to react to the hardover event.

Although the automatic response of the inventive control law does not completely stop or reverse the undesired roll rate, it does give the pilot sufficient time to provide control input to other control surfaces to counteract, and potentially reverse, the unwanted roll movement. In a typical scenario, the pilot will have additional seconds to realize that a hardover event has occurred and provide counteracting control input. The necessary counteracting control input will also be less than without the inventive control law, because the control law will continue to provide counteracting roll control after the pilot input.

Since the inventive control law calculates an expected roll rate based on assumptions regarding the planes aerodynamic parameters, there is a possibility of some error in the predicted roll rate. This error may be due to changing weight distributions in the aircraft due to cargo or fuel loads, or errors generated by the measurement devices used to measure parameters of the aircraft motion. In the simulations depicted in FIGS. 3-5, calculations simulate an error of 20% between the actual roll mode time constant of the simulated aircraft and the predicted roll mode time constant of the simulated aircraft. Despite the intentional error between predicted and actual roll mode time constants for the aircraft, the resulting roll rates were still very similar for both traditional control law and inventive control law. Thus, the inventive control law will function as desired under real world circumstances and limitations without the need for a more complicated fuel load prediction or other algorithms designed to reduce the error in the roll mode time constant used in the inventive control law.

In addition to errors in the roll mode time constant, error may also arise in other parameters such as the roll rate prediction. In the simulations depicted in FIGS. 6 and 7, the simulated predicted roll rate is 15% higher than the actual roll rate created by the command input. This error creates additional corrective roll command than if there was no error in the predicted roll rate.

Figure 6:
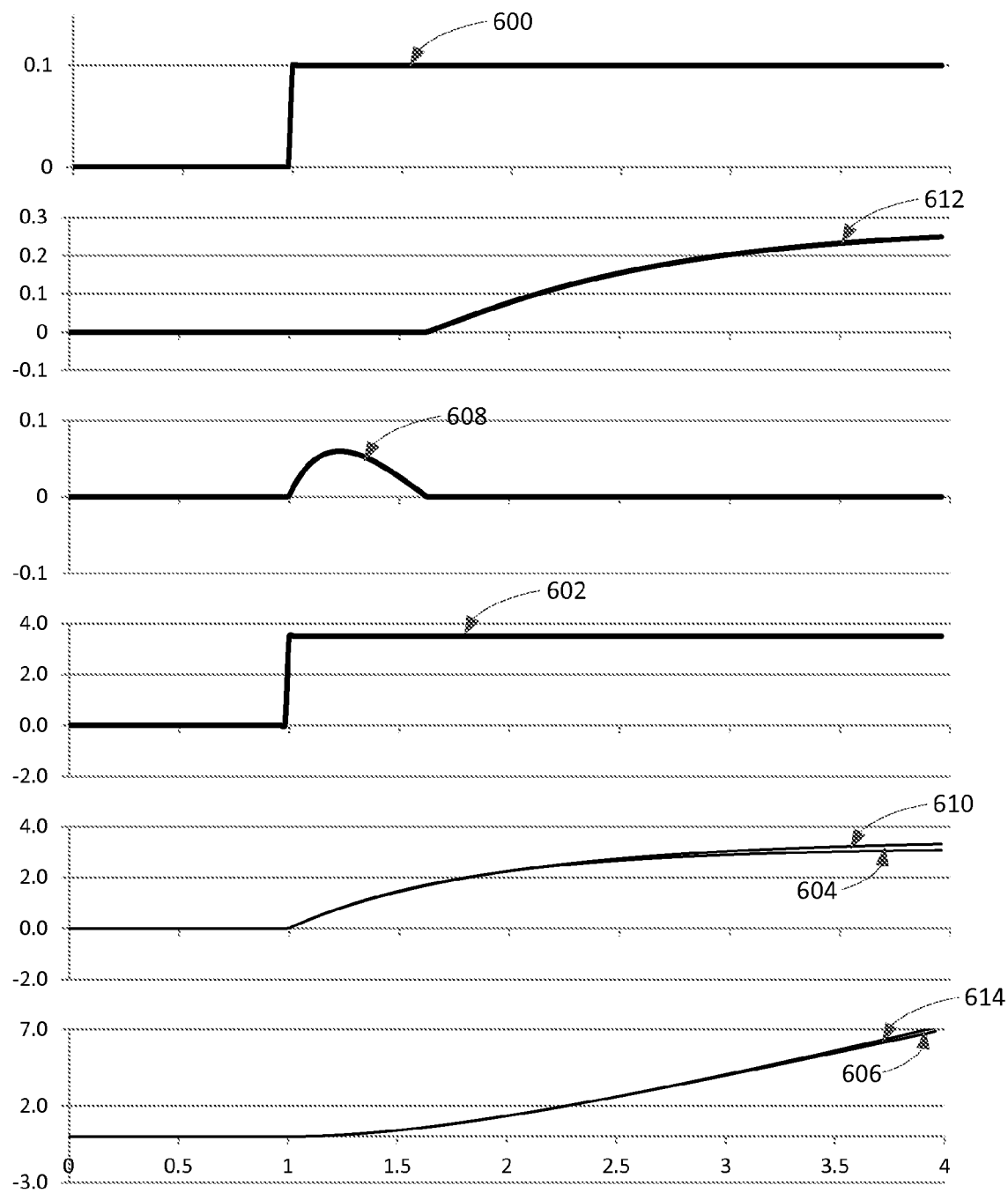
FIG. 6 depicts aircraft response to pilot input for aircraft utilizing a traditional control law and a control law comprising an embodiment of the invention.

Referring now to FIG. 6, aircraft response to pilot input for aircraft utilizing a traditional control law and a control law comprising an embodiment of the invention is depicted. The pilot input 600 comprises a step input of a roll command. This corresponds to slightly turning a control yoke or tilting a control stick to the side. In both the traditional control law and embodiments of the inventive control law, the input 600 causes a control surface to deflect. In the depicted embodiment, the ailerons of the aircraft are deflected as shown in graph 602. The single step input in command 600 results in a single step change in the deflection of the roll control surfaces 602. In the traditional control law, no other control surface deflections arise from the command input 600. The deflection 602 creates a roll rate 604 and a roll angle 606.

In the embodiment of the aircraft utilizing the inventive control law, additional roll control commands are developed by the aircraft control system in response to the command input 600. The expected roll rate from command input 600 includes the intentionally simulated error of 20%, while the actual roll rate does not include the error. The initial difference between the expected and actual roll rates causes the inventive control law to generate additional roll command to attempt to alter the actual roll rate to coincide with the expected roll rate. In the depicted embodiment of the inventive control law, this additional roll command comprises spoiler command 608. This command tends to increase the actual roll rate 610 and the actual roll angle 614 of the aircraft to more closely match the expected roll rate and roll angle based on command input 600. As the measured roll rate 610 of the aircraft exceeds the predicted roll rate calculated by the control law, an opposing spoiler command 612 is commanded to reduce the actual roll rate 610 and the actual roll angle 614 back to the predicted value.

Figure 7:
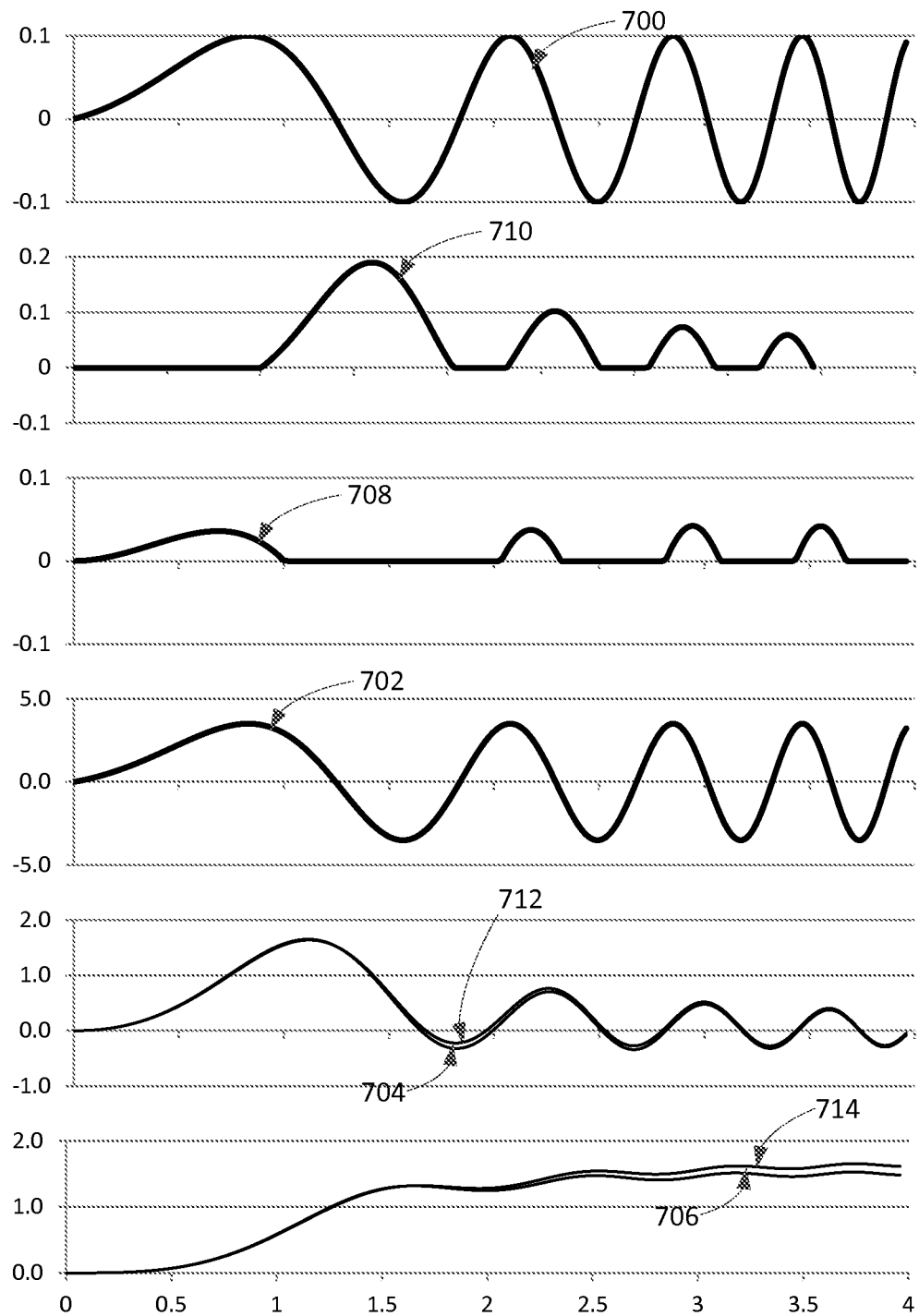
FIG. 7 depicts aircraft response to pilot input for an aircraft utilizing a traditional control law and a control law comprising an embodiment of the invention.

Referring now to FIG. 7, aircraft response to pilot input for aircraft utilizing a traditional control law and a control law comprising an embodiment of the invention is depicted. Pilot input 700 depicts an oscillating input by the pilot of the aircraft. Both the traditional control law and the inventive control law generated aileron deflection as depicted by graph 702. The traditional control law does not generate any other roll control surface deflection based on the control input 700. As a result of the deflections commanded by the traditional control law, the aircraft develops roll rate 704 and bank angle 706.

The inventive control law does generate additional roll control surface deflection similar to that described in relation to prior figures. Spoiler commands 708 and 710 are also generated as a result of the difference between the predicted roll rate and the actual roll rate of the aircraft due to the simulated 15% roll rate and 20% roll mode time constant error as described above. The combined effect of aileron deflection 702 and spoiler deflections 708 and 710 is the roll rate 712 and bank angle 714. As can be seen in FIG. 7, the roll rates and bank angles developed by aircraft using either control law are very similar during normal operation, as is desired. Only when a significant uncommanded roll rate develops does the inventive control law differ significantly from the aircraft motion caused by the traditional control law. This is true even when assuming and simulating non-trivial errors in the prediction of roll rate and the roll mode time constant.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:
1. A method of operating an aircraft to counteract unintended control surface deflections, the method comprising the steps of:
receiving a control input for providing a control surface deflection for the aircraft;

calculating, using a flight computer onboard the aircraft, an expected value for a parameter of aircraft motion based on the control input;

determining a measured value using a sensor onboard the aircraft configured for measuring the parameter of aircraft motion based on the actual motion of the aircraft;

calculating an error signal representing the difference between the expected value and the measured value;

calculating a nominal command for operating a control surface of the aircraft based on the control input;

adding the error signal to the nominal command to calculate a modified command; and operating the control surface in response to the modified command to reduce the error signal.

2. The method of claim 1 wherein the step of calculating an expected value for the parameter of aircraft motion comprises the steps of:

calculating a command for at least one control surface of the aircraft based on the control input;

calculating an expected value for the parameter of motion based on the command for the at least one control surface.

3. The method of claim 2 wherein the at least one control surface is a spoiler and the parameter of motion is the spoiler roll rate of the aircraft.

4. The method of claim 3 wherein the step of calculating an expected value for the parameter of aircraft motion further comprises the steps of:

calculating a command for an aileron based on the control input;

calculating an expected aileron roll rate based on the command for an aileron;

adding the expected aileron roll rate to the spoiler roll rate to calculate the expected value of the parameter of aircraft motion.

5. The method of claim 4 further comprising the steps of:
estimating a value for the sideslip of the aircraft;
subtracting the value from the expected value of the parameter of aircraft motion.

6. The method of claim 5 wherein the step of estimating a value for the sideslip of the aircraft comprises measuring the value of a yaw command signal.

7. The method of claim 1 wherein the unintended control surface deflection is a control surface disconnection event.

8. The method of claim 1 wherein the step of determining the value for the parameter of aircraft motion comprises measuring the parameter.

9. The method of claim 1 wherein the step of determining the value for the parameter of aircraft motion comprises the steps of:

measuring at least one characteristic of motion of the aircraft;

calculating the value for the parameter of aircraft motion based on the at least one characteristic of motion.

10. The method of claim 1 wherein the unintended control surface deflection is a hardover event.

11. A method of operating an aircraft to counteract unintended control surface deflections, the method comprising the steps of:

receiving a control input for providing a control surface deflection for the aircraft;

calculating a command for a first rudder segment based on the control input;

calculating a first expected yaw rate based on the command for the first rudder segment;

calculating a command for a second rudder segment based on the control input;

calculating a second expected yaw rate based on the command for the second rudder segment;

adding the first expected yaw rate to the second expected yaw rate to calculate an expected value of the yaw rate;

determining a measured value using a sensor onboard the aircraft configured for measuring the yaw rate based on the actual yaw rate of the aircraft;

calculating an error signal representing the difference between the expected value and the measured value; and operating a control surface of the aircraft to reduce the error signal.

12. A method of operating an aircraft having a first control surface and a second control surface, the method comprising the steps of:

accepting a command input for the aircraft;

calculating an expected value for a parameter of motion related to the first and second control surfaces based on the command input;

measuring an actual value of the parameter of motion using a sensor onboard the aircraft;

calculating an error signal representing the difference between the expected value and the actual value of the parameter of motion;

calculating a nominal command for either the first or the second control surfaces based on the command input;

adding the error signal to the nominal command to calculate a modified command; and operating either the first or the second control surfaces in response to the modified command to counteract the error signal.

13. The method of claim 12 wherein the parameter of motion is the roll rate of the aircraft.

14. The method of claim 13 wherein the first control surface is a spoiler and the second control surface is an aileron.

15. The method of claim 12 wherein the step of calculating an expected value comprises multiplying the command input by a gain.

16. The method of claim 15 further comprising the step of applying a low-pass filter to the expected value of the parameter of motion.

17. The method of claim 12 wherein the parameter of aircraft motion is the yaw rate of the aircraft.

18. The method of claim 17 wherein the step of calculating an expected value for the parameter of aircraft motion comprises the steps of:

calculating a command for a first rudder segment based on the command input;

calculating a first expected yaw rate based on the command for the first rudder segment;

calculating a command for a second rudder segment based on the command input;

calculating a second expected yaw rate based on the command for the second rudder segment;

adding the first expected yaw rate to the second expected yaw rate to calculate the expected value of the parameter of aircraft motion.

* * * * *